(12) United States Patent
Himanen et al.

(10) Patent No.: US 9,573,442 B2
(45) Date of Patent: Feb. 21, 2017

(54) UTILITY VEHICLE VENTILATION SYSTEM

(75) Inventors: Henry Himanen, Jyvaskyla (FI); Totte Virtanen, Jyvaskyla (FI)

(73) Assignee: Valtra Oy Ab, Suolahti (FI)

( * ) Notice: Subject to any disclaimer, the term of this patent is extended or adjusted under 35 U.S.C. 154(b) by 1198 days.

(21) Appl. No.: 13/383,025

(22) PCT Filed: Jul. 6, 2010

(86) PCT No.: PCT/IB2010/001662
§ 371 (c)(1),
(2), (4) Date: Jan. 9, 2012

(87) PCT Pub. No.: WO2011/004243
PCT Pub. Date: Jan. 13, 2011

(65) Prior Publication Data
US 2012/0108156 A1    May 3, 2012

(30) Foreign Application Priority Data
Jul. 9, 2009    (GB) .................... 0911935.5

(51) Int. Cl.
B60H 1/00    (2006.01)
B60H 3/06    (2006.01)

(52) U.S. Cl.
CPC ........ B60H 3/0633 (2013.01); B60H 1/00378 (2013.01); B60H 3/0641 (2013.01)

(58) Field of Classification Search
CPC ... B60H 1/00378; B60H 3/0633; B60H 3/064; B60H 3/0608; B01D 46/0056; B01D 46/0073
USPC ....... 454/140, 139, 158; 55/385.3, 431, 466, 55/467, 482, 443, 332, 436
See application file for complete search history.

(56) References Cited

U.S. PATENT DOCUMENTS

| 3,126,263 | A | * | 3/1964 | Schwab | B01D 46/26 415/216.1 |
| 3,657,992 | A |   | 4/1972 | Minnick, Jr. | |
| 3,778,982 | A | * | 12/1973 | Birke | B01D 46/0073 55/290 |
| 4,492,151 | A | * | 1/1985 | Mattei | 454/70 |
| 4,531,453 | A |   | 7/1985 | Warman | |
| 4,971,518 | A |   | 11/1990 | Florin | |

(Continued)

FOREIGN PATENT DOCUMENTS

DE    19929456 A1    12/2000
FR    2501340 A1    9/1982

(Continued)

OTHER PUBLICATIONS

International Search Report for International Application No. PCT/IB2010/001662 Dated Jul. 10, 2010.

(Continued)

*Primary Examiner* — Avinash Savani
*Assistant Examiner* — Vivek Shirsat (57) ABSTRACT

A utility vehicle, cab ventilation system which includes a fan and a main filter located in the cab roof section with an upstream pre-filter mounted on the exterior of the cab roof. The pre-filter rotates about an axis parallel to air flow and centrifugally forces matter outward, effectively reducing material build up and frequency of service to the main filter within the roof section. The pre-filter can be built into a new cab ventilation system or provided in a module, for adding to existing cab ventilation systems.

14 Claims, 8 Drawing Sheets

(56) References Cited

U.S. PATENT DOCUMENTS

| | | | |
|---|---|---|---|
| 5,059,224 A * | 10/1991 | Kikkawa et al. | 96/19 |
| 5,342,238 A * | 8/1994 | Segerpalm et al. | 454/136 |
| 5,468,183 A * | 11/1995 | Hahn | 454/136 |
| 5,480,464 A * | 1/1996 | De Villiers et al. | 55/320 |
| 6,217,439 B1 * | 4/2001 | Janeling et al. | 454/158 |
| 6,296,823 B1 | 10/2001 | Ertl et al. | |
| 7,115,156 B2 * | 10/2006 | Schaerlund et al. | 95/268 |
| 7,682,413 B2 * | 3/2010 | Sheidler | 55/345 |
| 8,529,324 B2 * | 9/2013 | Moredock et al. | 454/155 |
| 8,641,792 B2 * | 2/2014 | Vladaj et al. | 55/385.3 |
| 2003/0073400 A1 * | 4/2003 | Dahl et al. | 454/139 |
| 2008/0016833 A1 * | 1/2008 | Sheidler et al. | 55/385.3 |

FOREIGN PATENT DOCUMENTS

| | | |
|---|---|---|
| FR | 2518894 A1 | 7/1983 |
| WO | WO-01/10536 A1 | 2/2001 |
| WO | WO-2004/098749 A1 | 11/2004 |

OTHER PUBLICATIONS

Great Britian Search Report for Great Britain Application No. GB0911935.5 Dated Jan. 13, 2010.

* cited by examiner

UTILITY VEHICLE VENTILATION SYSTEM

The invention relates to ventilation systems fitted to the cabs of utility vehicles, such as tractors, combine harvesters and plant machinery, said system serving to receive air from the environment, filter the air and supply the filtered air into the cab.

Utility vehicles are often required to work in dusty environments. The cab in which the driver sits is typically fitted with a ventilation system which ensures the comfort and safe working environment for the driver. The filter, or filters, of the ventilation system often require routine cleaning or replacement. The period between filter servicing is significantly reduced when working in extremely dusty environments. In some cases, the filter requires attention several times a day leading to unacceptable downtime.

To compound the problem of frequent filter maintenance, the filter is often housed in such a way which requires the removal of several components to gain access thereto.

It is an object of the invention to provide a utility vehicle ventilation system which requires less maintenance and, therefore, less downtime.

It is another object of the invention to provide a utility vehicle ventilation system which is simple to maintain.

It is yet another object of the invention to provide a utility vehicle ventilation system which requires less maintenance and which can be easily obtained from simple modification to existing utility vehicle ventilation systems.

According to the invention there is provided a utility vehicle comprising a ventilation system which receives air from the environment, filters the air and supplies the filtered air into a cab, the system comprising a fan to drive air through a channel from the environment to the cab, a main air filter arranged within a roof section of the cab and downstream of a pre-filter which rotates about a rotation axis which is substantially parallel to the air flow through the pre-filter. By providing a rotating pre-filter upstream of the main filter, maintenance of the system is required less often.

The rotation of the pre-filter reduces the particulate build up thereon due to the radial air flow created and the centrifugal forces exerted on the incident dust. Furthermore, the majority of the dust is removed from the air flow before reaching the main filter. Therefore, removal of the main filter is seldom required.

The pre-filter can be located externally of the roof structure. This is particularly advantageous on a utility vehicle because maintenance (e.g. clearing) of the pre-filter does not require the time-consuming removal of components associated with the main cab structure.

Preferably, the pre-filter is mounted to an electric motor and, preferably, the electric motor is dedicated to rotating the pre-filter. Alternatively, the pre-filter is driven by a hydraulic motor or air-driven turbine.

Preferably, the channel immediately downstream of the pre-filter has a diameter which is less than the diameter of the pre-filter. Advantageously, by overlapping beyond the area of the channel with the pre-filter, the particulate removal effect is significantly improved. The dust thrown off of the periphery of the pre-filter is not reintroduced into the clean air flow. Instead, the removed dust is thrown against a wall of the channel and/or thrown out of a pre-filter module away from the intake air flow.

The fan is preferably located downstream of the pre-filter and, preferably further still, downstream of the main filter. Therefore, the air is sucked through at least one of the pre-filter and main filter before being propelled into the cab. The fan is preferably driven by a dedicated electric motor.

The system may further comprise an air conditioning evaporator to cool the air. This may be disposed in the air stream between the main filter and fan for example.

Preferably, the roof section of the cab is at least partly formed of moulded plastic and at least a portion of the channel is defined by channel elements moulded into the roof section.

Advantageously, this reduces the number of components required to provide the ducting which channels the air between the various system elements.

The channel preferably includes a recycle inlet through which recycled air from the cab is drawn, the recycle inlet being closable by a blocking element which is moveable between a normal position and a recycle position wherein the channel upstream of the recycle inlet is blocked to prevent the intake of air from the environment. Advantageously, this provides the option to block the intake of air from the surroundings. For example, this may be preferred when spraying chemicals on a crop field. The recycle inlet is preferably located upstream of the main filter and downstream of the pre-filter filter. This ensures continued filtering of the recycled air whilst allowing easy access to and/or removal of the pre-filter.

Preferably, the rotation axis is substantially vertical. Advantageously, this encourages the particulate matter collected by the pre-filter to fall under gravity away therefrom, thereby increasing the period between maintenance.

The pre-filter and motor is preferably housed within a pre-filter housing which includes a covering inlet vent upstream of the pre-filter. The covering inlet vent may be removable to enable easy access to the pre-filter for cleaning and replacement.

A portion of the channel between the main filter and pre-filter may be integrated within the roof section. This may leave only the pre-filter housing to be attached to the roof thus minimising components whilst enabling easy access to maintain the pre-filter.

Alternatively, the pre-filter and motor may be integrated into a detachable pre-filter module which is mounted to the roof section. Advantageously, this allows an existing utility vehicle, with a conventional ventilation system, to be simply modified with the attachment of the pre-filter module. This minimises expense in that no modifications are necessary to the hardware of existing vehicles. Furthermore, the pre-filter module can be offered to the customers of vehicle manufacturers as an optional extra. In this case, the module can be added to the vehicle late in the assembly process, thus minimising any changes to the existing assembly line.

The pre-filter module may include a channel portion downstream of the pre-filter having an outlet orifice which cooperates with an inlet vent formed in a face of the roof section. This enables simple attachment of the module to the roof section.

A releasable wired link may be provided to releasably connect the motor to a power source located on the vehicle. Therefore, installation of the module simply involves the attachment of the module to the vehicle and then connection of the wired link to provide power to the motor.

Further advantages of the invention will become apparent from the following description of specific embodiments with reference to the appended drawings in which:

FIG. 8 is a perspective view of the ventilation system of FIG. 4 showing the direction of airflow there-through.

FIG. 9 is a plan view of the ventilation system of FIG. 4 showing the direction of airflow there-through.

FIG. 12 is a perspective view of the pre-filter module of FIG. 11 showing the direction of airflow there-through;

Figure 1:
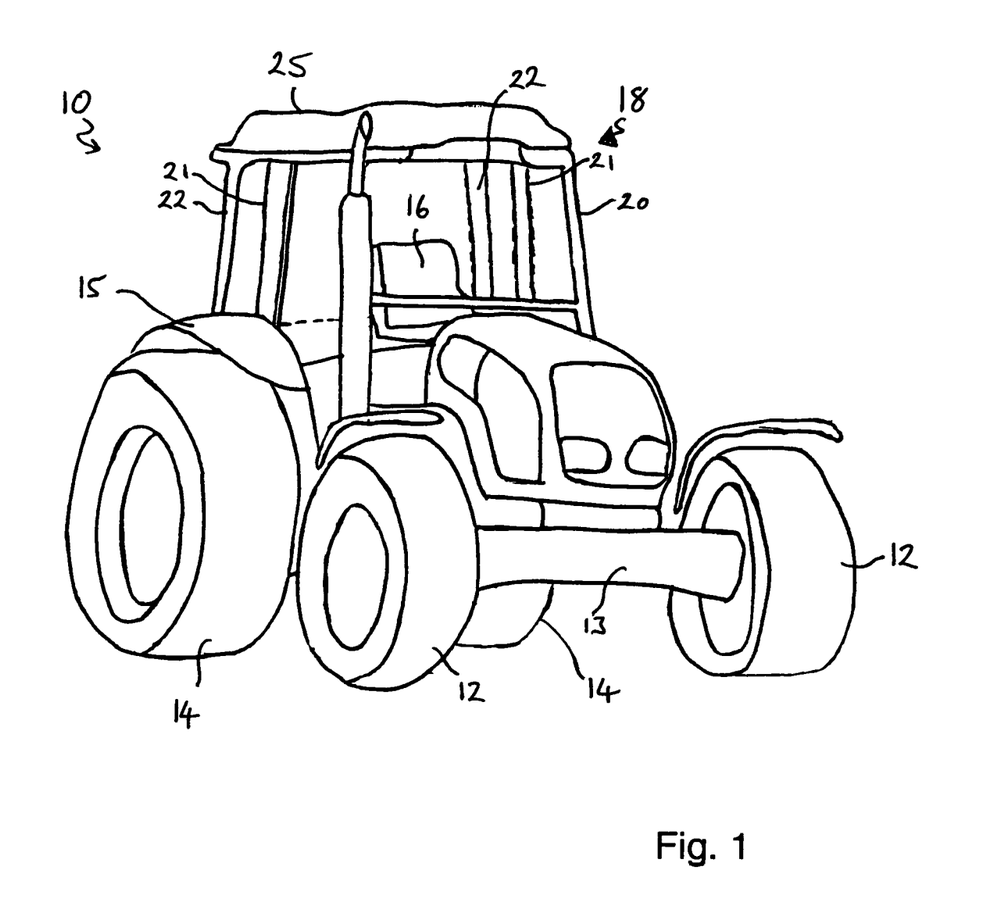
FIG. 1 is a perspective view of a tractor.

With reference to FIG. 1, a tractor 10 comprises a pair of front steerable wheels 12 mounted on respective ends of a front axle 13, and a pair of rear wheels 14 which are at least partially covered by rear wheel fenders 15. A driver sits in a driver's seat 16, the space around which is protected by cab 18. A roll-over protection structure (ROPS) provides a framework for the cab 18 and includes a pair of front A-pillars 20, a pair of intermediate B-pillars 21, and a pair of rear C-pillars 22. The ROPS further includes a front generally transverse member 26, a rear generally transverse member 27 and a pair of generally longitudinal members 28 the combination of which provides a rigid support frame for the roof 24,25 and ventilation system to be described below.

With reference to FIGS. 2-7, a first embodiment of the invention is shown in which the tractor roof section includes a top moulded portion 25 and a bottom moulded portion 24 which are formed, for example, by blow-moulding plastic and cover the components of the ventilation system. It should be understood that the top roof section 25 is not shown in FIGS. 3, 4, 5 and 7.

Starting at the inlet of air, the ventilation system, referenced generally at 30, comprises a pre-filter 32 which is housed within a pre-filter unit 33. The construction and operation of pre-filter unit 33 will be described in more detail below.

The pre-filter unit 33 is mounted to a first ducting section 34 which conveys the air-stream from pre-filter unit 33 to a main filter unit 35, the latter housing a main filter (not shown) through which the ventilation air-stream passes. The first ducting section 34 sealably connects to the main filter housing 35 by a generally rectangular attachment interface 36 which includes securing means (not shown) to hold the first ducting member 34 in position. For example, this connection may be a simple male/female connection with the male part being associated with the first ducting section.

The main filter contained within main filter unit 35 is formed of a fibrous material and serves to trap dust and particulate matter, thereby cleaning the air which has been drawn in from the environment via the pre-filter unit 33.

Figure 2:
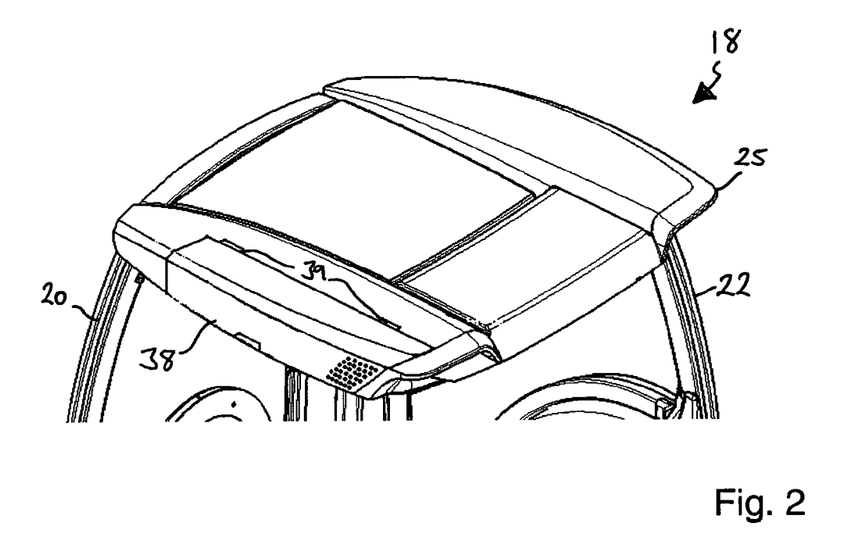
FIG. 2 is a perspective view showing the roof of a tractor in accordance with a first embodiment of the invention.
Figure 3:
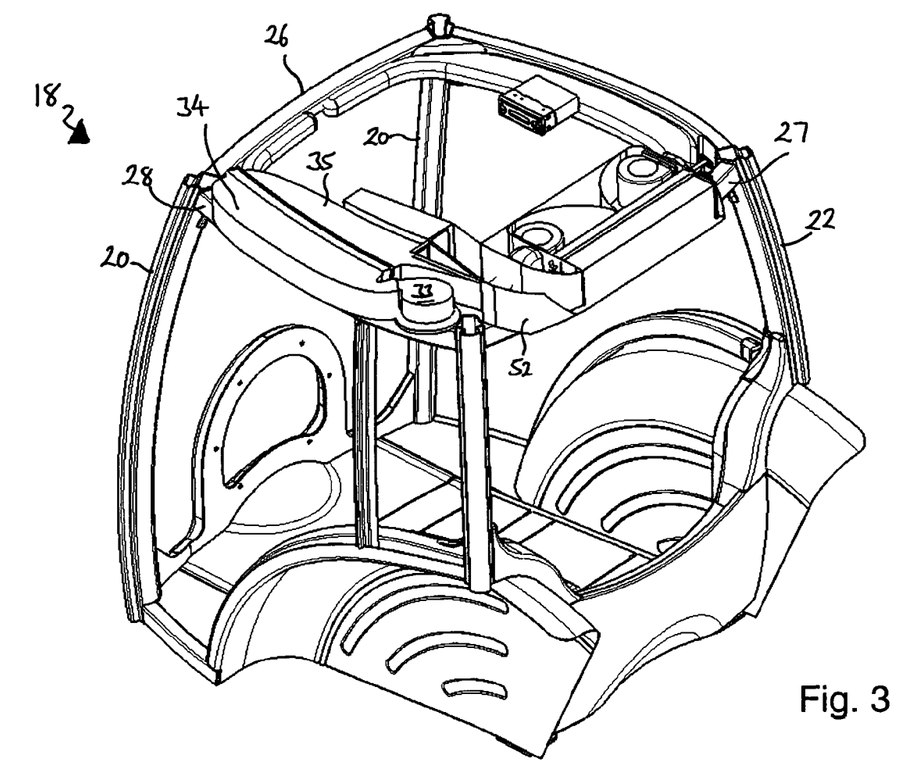
FIG. 3 is a perspective view of the cab of the tractor of FIG. 2 shown with part of the roof removed.
Figure 4:
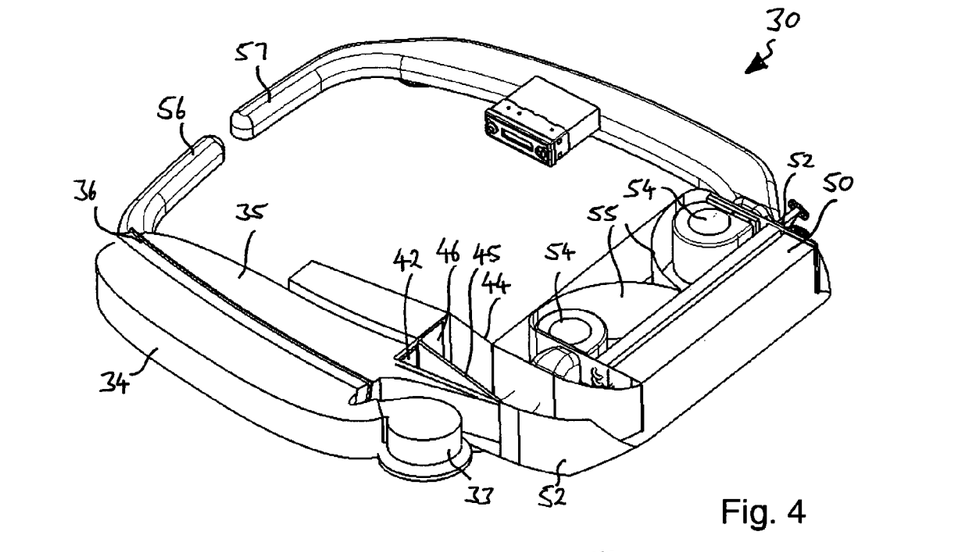
FIG. 4 is a perspective view showing in isolation the ventilation system of the tractor of FIG. 2.
Figure 5:
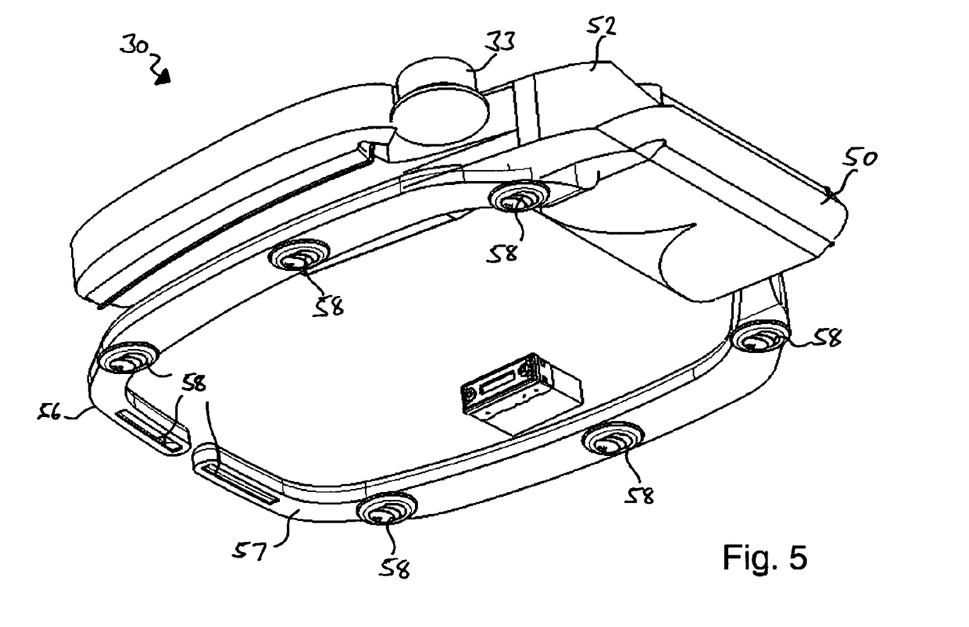
FIG. 5 is a perspective view of the ventilation system of FIG. 4 viewed from the underside.
Figure 6:
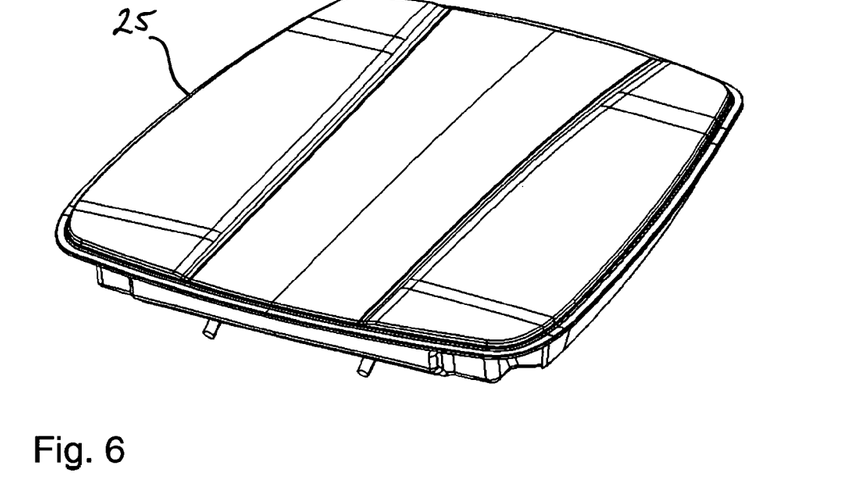
FIG. 6 is a perspective view of the top roof element of the utility vehicle cab of FIG. 2.
Figure 7:
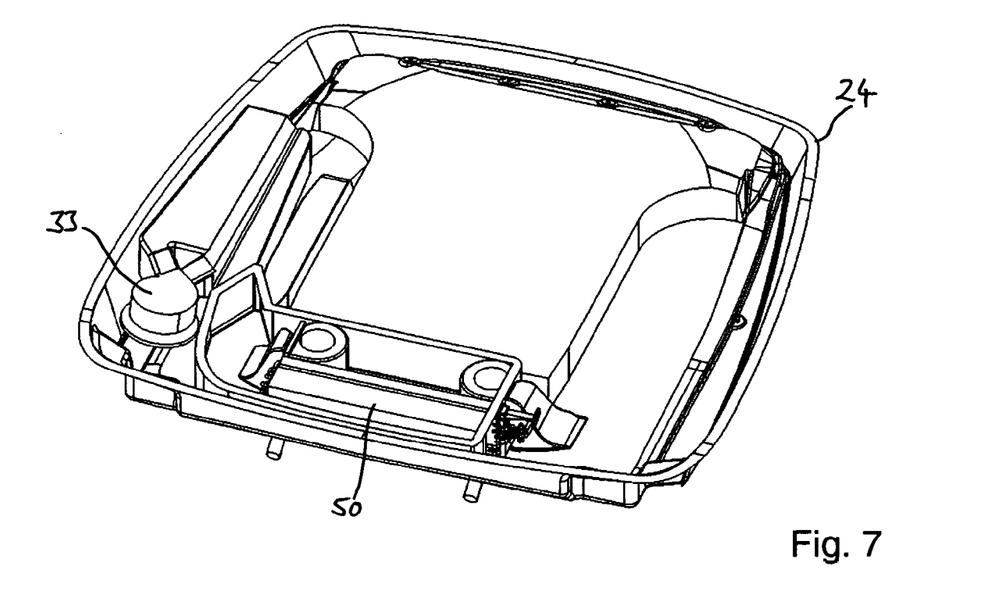
FIG. 7 is a perspective view of the ventilation system of FIG. 4 showing the lower part of the roof construction.
Figure 8:
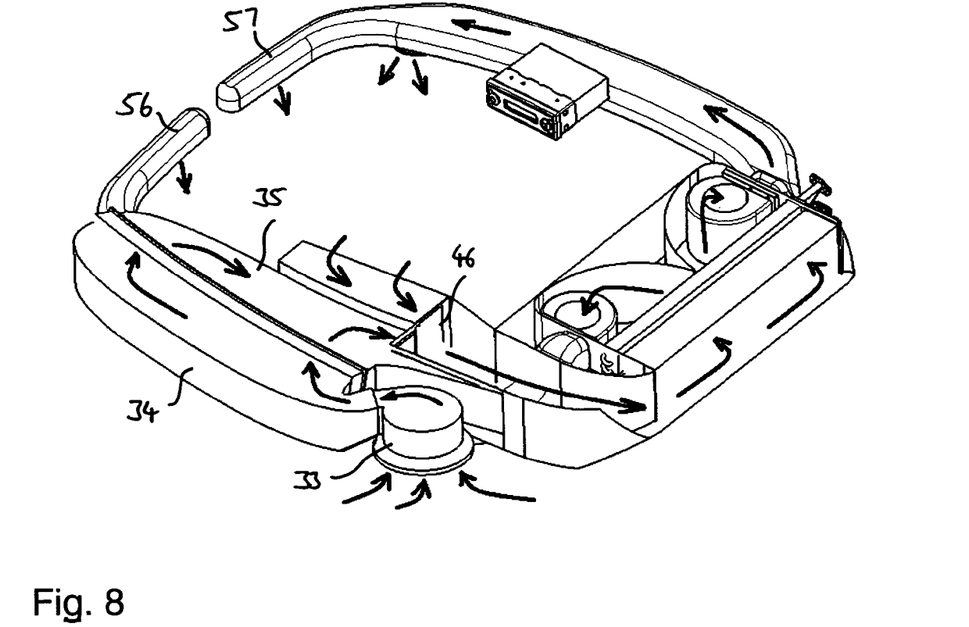
Figure 9:
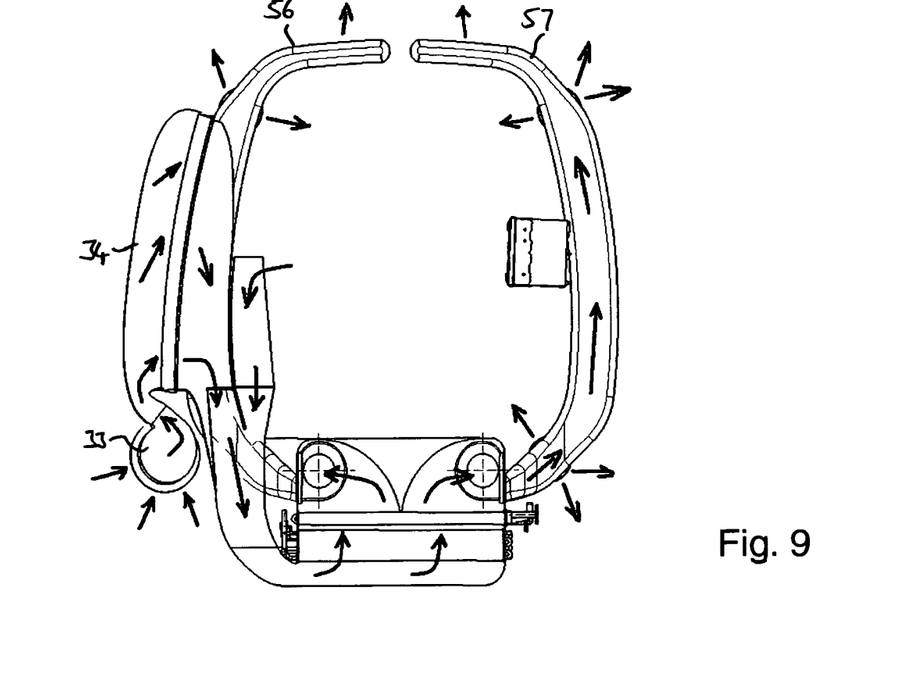

With reference in particular to FIG. 2, a cover 38 is pivotally connected by hinges 39 to the top roof section 25. The cover 38 hinges upwardly and provides simple access to the pre-filter unit 33 for maintenance thereof. Furthermore, the main filter housing can be simply accessed by removal of first ducting section 34. To conceal the pre-filter unit 33 and first ducting section 34, the cover 38 conforms with the profile of the roof 24.

Figure 10:
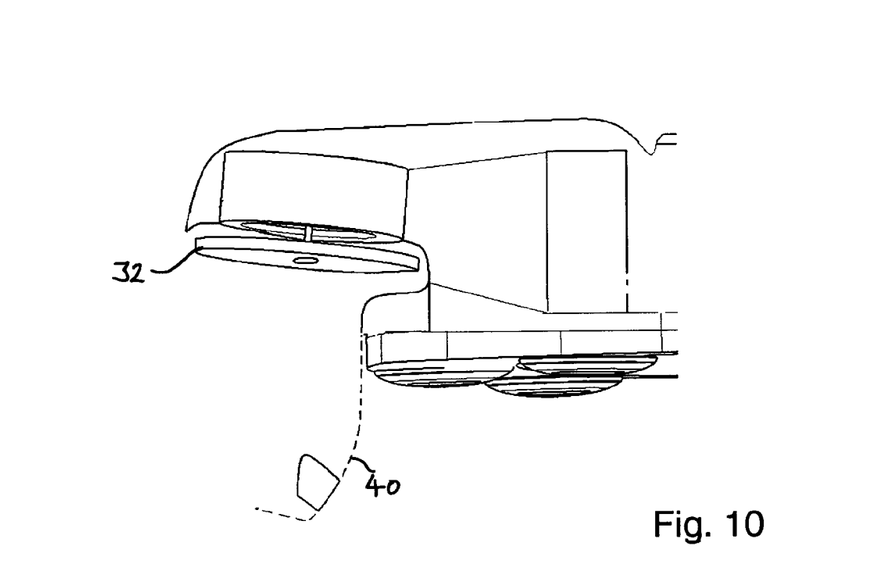
FIG. 10 is a rear view of part of the roof of the utility vehicle of FIG. 2.
Figure 11:
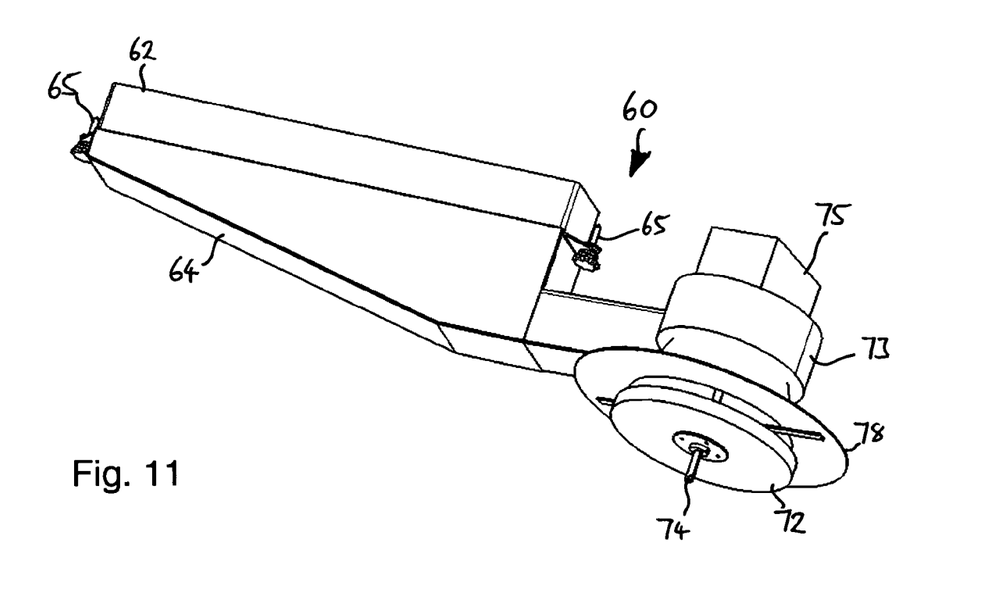
FIG. 11 is a perspective view of an add-on pre-filter module in accordance with a second embodiment of the invention.

With reference to FIG. 10, a cover 40 encloses the pre-filter 32 and pivots downwardly to give access thereto.

Working upstream, the air leaves the main filter unit 35 through outlet 42 (FIG. 4) and passes into a junction chamber 44. A flap 45 is movable between a normal position and a recycle position. In the recycle position (shown in FIGS. 3 and 4) the incoming air from outlet 42 is blocked and recycled air is allowed to pass from the cab interior via a cycle inlet 46 on to the H-vac unit 50. In the normal position the flap 45 serves to partially block the air from the recycle unit 46 and allow the filtered air from the main filter housing 35 to pass into a heating, ventilation and air conditioning (HVAC) unit 50. Typically, the normal position allows a mixture of 50% fresh air and 50% recycled air to pass into the HVAC unit 50.

The air-stream is conveyed from the junction housing 44 to the HVAC unit 50 by a second ducting section which is formed from side-walls 52 which are integrated into the overall roof structure.

HVAC unit 50 is of a known type and includes a heater element to heat the air-stream when required, and an evaporator 54 which serves to cool the air-stream when required. The HVAC unit 50 is integrated into the bottom roof member 24, is secured to the rear transverse cab member 27 and is enclosed within the roof space formed between top roof member at 25 and the bottom roof member 24. In summary thereof, the HVAC unit 50 serves as a heat exchanger through which the filtered air can be either heated or cooled as required.

A pair of blowers 54 are arranged on the downstream side of the HVAC unit 50 and provide the propulsive force which draws in air from the environment and forces it out into the driver's cab 18. A dividing wall 55 splits the air-stream into a left-hand and right-hand sub-stream each having a respective blower 54. Each sub-stream of air is delivered into the cab 18 by third and fourth ducting sections 56, 57 having integrated air vents 58.

As in known ventilation systems, the air-flow speed can be adjusted by the driver by appropriate control of the blower speed. Furthermore, the driver can tailor the clean air distribution by appropriate adjustment of the individual vents 58. The temperature of the air can be adjusted by appropriate control of the HVAC unit 50.

The above-described arrangement includes a pre-filter unit 33 and first ducting member 34 which is integrated inside the profile of the roof 24 so as to conceal the presence thereof. These components can be added during assembly of the vehicle or at a later stage. However, it is envisaged that a pre-filter unit can be added as part of an additional module to a utility vehicle having a main filter only.

FIGS. 11-14 illustrate a second embodiment of the invention wherein a pre-filter module 60 is secured to an air intake of an existing utility vehicle ventilation system. In this case, a male flange 62 provides an extension of a first ducting section 64 and inserts into the intake vent (not shown) of a tractor's ventilation system which is located on the underside (overhang) of a cab roof externally of the driver's space. Locking screws 65 are provided to secure the pre-filter module 60 to the tractor.

The construction and general operation of the pre-filter units of both described, exemplary, embodiments follow the same basic principals and will be described in relation to the 'add-on' version shown in FIGS. 11 to 14. Therefore, it should be understood that the described construction and operation can be applied to the 'integrated' version shown in FIGS. 2 to 10.

A pre-filter element 72 is housed within a pre-filter unit 73 which is connected to the first ducting member 64 so as to allow filtered air to pass from the pre-filter unit 73 into the tractor's ventilation system. The pre-filter element 72 is mounted on a shaft 74 which is connected to an electrical motor (not shown) which is housed within motor housing 75. The pre-filter element 72 is secured in fixed engagement with shaft 74 by locking nuts 76. A centring rod 77 is secured to the underside of flange 78 and serves as a guide for the shaft 74 to ensure that the latter maintains a central position.

Flange 78 is annular in shape and includes an air intake orifice 80 which has a diameter less than that of the pre-filter element 72. As can be seen from FIG. 14, pre-filter element 72 is held in close engagement with the flange 78 and the outside edge of pre-filter 72 overlaps the edge of inlet orifice 80 by a distance X. The pre-filter element 72 is rotated at a speed of approximately 1500-3000 rpm by the electrical motor.

Air is drawn in through the rotating pre-filter element 72 and passes into a conical transfer housing 82 before being conveyed at 90° into first ducting section 64. The rotational motion of pre-filter element 72 creates a proximate radial airflow which forces particulate matter radially outwardly so as not to collect on the surface of pre-filter element 72. Due to the overlap X between the pre-filter element 72 and intake orifice 82 there is minimal airflow through the peripheral region of the former. The blocked particulate matter eventually falls downwardly due to gravity when it reaches the edge of pre-filter element 72. Advantageously, the substantially vertical orientation of the pre-filter exploits gravity to remove the blocked particulate matter. Furthermore, the overlap X prevents the ingress of particulate matter around the outside of pre-filter element 72, by effectively producing a labyrinth seal. Also, a subsidiary radial airflow exists between the pre-filter element 72 and the flange 78 which also blocks the particulate matter.

It should be understood that the pre-filter element 72 is enclosed by a perforated cover (not shown) for safety reasons.

Figure 12:
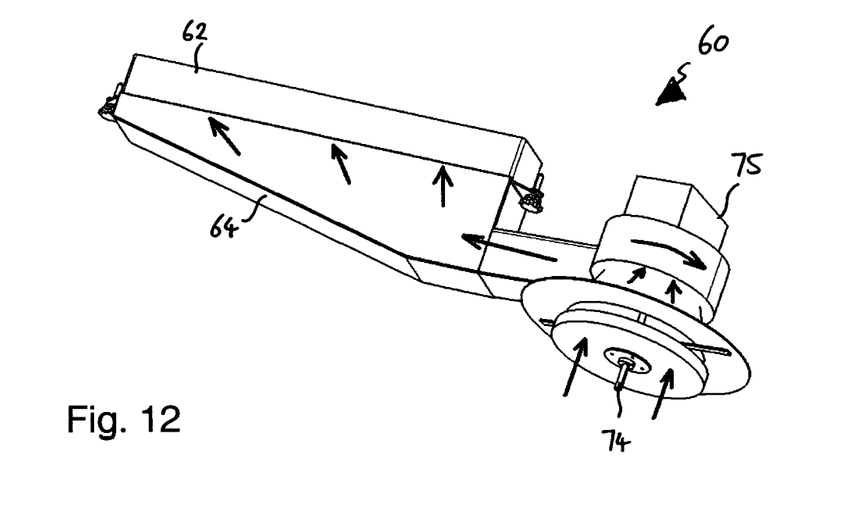
Figure 13:
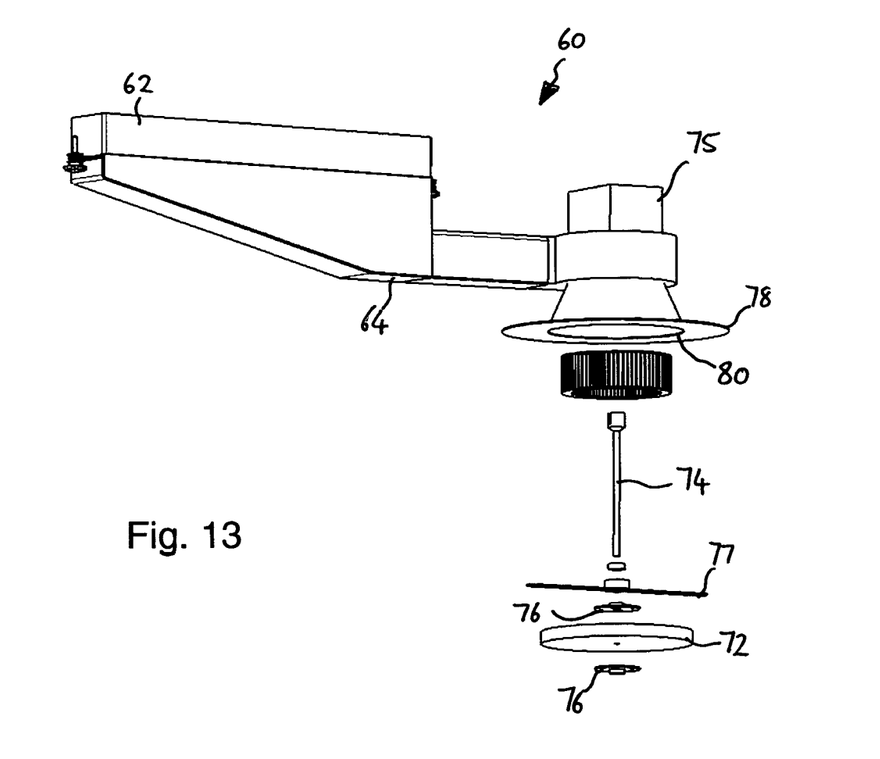
FIG. 13 is a perspective view of the pre-filter module of FIG. 11 showing components of the pre-filter in exploded form.
Figure 14:
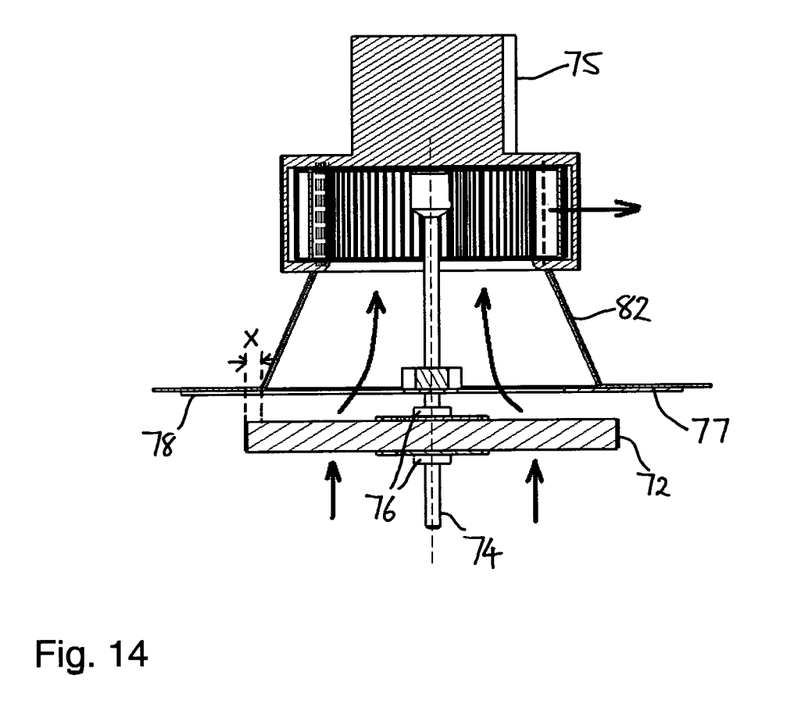
FIG. 14 is a sectional view of a pre-filter in accordance with the second embodiment of the invention; and, FIG. 15 is a plot illustrating the filtration efficiency of the ventilation system for both a rotating pre-filter and a stationary pre-filter.

The layout of first ducting member 64 requires appropriate design in order to maintain a vertical rotation axis for the pre-filter element whilst enabling simple addition of the module to an existing system. For example, the arrangement shown in FIGS. 12-14 is suitable for a tractor having an inlet vent which receives a vertical airflow. However, it will be appreciated that a pre-filter module may be designed to cater for an air intake which is horizontal in nature and is comparable to the pre-filter unit 33 and first ducting member 34 of the embodiment shown in FIGS. 2-10.

The motor housed within motor housing 75 is connected to a power supply by a detachable lead (not shown). However it will be understood that the integrated version shown in FIGS. 2-10 may include a hard wiring which does not require routine detachment. Alternatively, the male/female connection of the attachment interface 36 may include an integrated electrical connection to supply power from the vehicle to the pre-filter unit.

As can be seen, the invention can be integrated into a new ventilation system for a tractor cab or, alternatively, achieved by providing an additional unit to an existing ventilation system. In the latter case, the pre-filter module 60 may be readily attached and detached to suit the operating conditions on a daily basis. For example, this allows a farmer to attach the pre-filter module when working in a dusty environment and detach the pre-filter module when not required so as to reduce the profile of the overall tractor.

Figure 15:
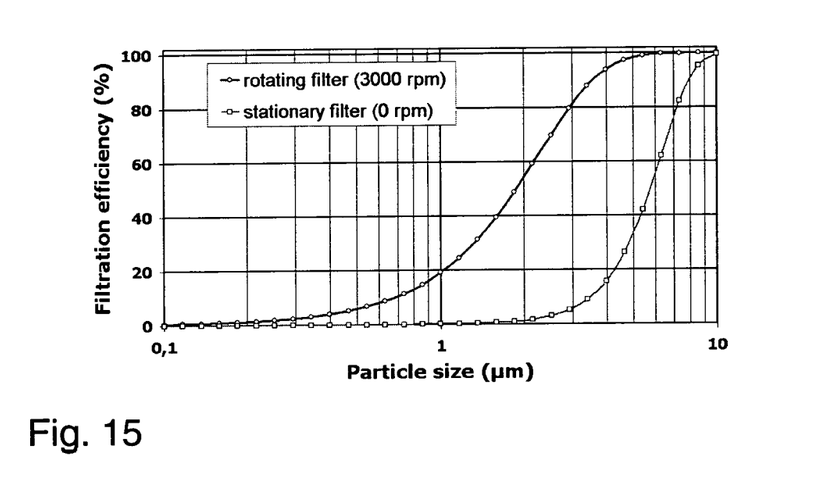

The effect of rotating the pre-filter element with respect to the filtration efficiency can be seen from FIG. 15. Rotating of the filter element significantly improves the removal of smaller particles from the air stream.

Although described in relation to an agricultural tractor it is envisaged that the inventive ventilation system can be applied to other utility vehicles such as plant machinery and combine harvesters without deviating from the scope of the invention.

The rotating pre-filter element described above in relation to the appended drawings is driven by an electric motor. However it is envisaged that the pre-filter element may be rotated by other means including a hydraulic motor or even an integrated turbine which is driven by the airflow through the ventilation system.

In another embodiment (not shown) a fan is disposed on the same shaft as the rotating pre-filter wherein the electric motor drives both elements. Advantageously, this provides additional propulsion to the air stream through the ventilation system.

In summary there is provided a utility vehicle comprising a ventilation system which receives air from the environment, filters the air and supplies the filtered air into a cab. The system comprises a fan to drive air through a channel from the environment to the cab, and a main air filter arranged within a roof section of the cab and downstream of a pre-filter. The pre-filter rotates about a rotation axis which is substantially parallel to the air flow through the pre-filter so as to reduce the particulate matter which reaches the main filter. The rotation of the pre-filter creates a centrifugal force and tangential airflow which forces the particulate matter radially outwardly to reduce the build-up of matter on the filter, thus reducing the frequency of servicing. The pre-filter can be integrated into a cab ventilation system or provided in a module which can be added to a vehicle having a conventional ventilation system.

The invention claimed is:

1. A utility vehicle comprising a cab ventilation system which receives air from the environment, filters the air and supplies the filtered air into a cab, the system comprising a fan to drive air through a channel from the environment to the cab, a main air filter arranged within a roof section of the cab and downstream of a pre-filter module, the pre-filter module comprising a pre-filter element which is mounted to an electric motor, wherein the pre-filter element rotates about a rotation axis which is substantially parallel to the air flow through the pre-filter element itself, the ventilation system further comprising a subsidiary fan which rotates about the rotation axis and is driven by the electric motor, wherein the channel immediately downstream of the pre-filter element has a diameter which is less than a diameter of the pre-filter element.

2. The utility vehicle according to claim 1, wherein the fan is disposed downstream of the pre-filter element.

3. The utility vehicle according to claim 2, wherein the fan is disposed downstream of the main filter.

4. The utility vehicle according to claim 1, wherein the system further comprises an air conditioning evaporator to cool the air.

5. The utility vehicle according to claim 1, wherein the roof section of the cab is at least partly formed of moulded plastic and at least a portion of the channel is defined by channel elements moulded into the roof section.

6. The utility vehicle according to claim 1, wherein the channel includes a recycle inlet through which recycled air from the cab is drawn, the recycle inlet being closable by a blocking element which is moveable between a normal position and a recycle position wherein the channel upstream of the recycle inlet is blocked to prevent the intake of air from the environment.

7. The utility vehicle according to claim 6, wherein the recycle inlet is located upstream of the main filter and downstream of the pre-filter filter.

8. The utility vehicle according to claim 1, wherein the rotation axis is substantially vertical.

9. The utility vehicle according to claim 1, wherein the pre-filter element and motor is housed within a pre-filter housing which includes a covering inlet vent upstream of the pre-filter element.

10. The utility vehicle according to claim 1, wherein a portion of the channel between the main filter and pre-filter element is integrated within the roof section.

11. The utility vehicle according to claim 1, wherein the pre-filter element and motor are integrated into a detachable pre-filter module which is mounted to the roof section.

12. The utility vehicle according to claim 11, wherein the pre-filter module includes a channel portion downstream of the pre-filter element having an outlet orifice which cooperates with an inlet vent formed in a face of the roof section.

13. The utility vehicle according to claim 11, wherein a releasable wired link connects the motor to a power source located on the vehicle.

14. The utility vehicle according to claim 1, wherein the channel has an air intake orifice having a diameter less than that of the pre-filter element such that an outside edge of the pre-filter element overlaps an edge of the intake orifice.

* * * * *